United States Patent
Gallagher

(10) Patent No.: US 7,831,100 B2
(45) Date of Patent: Nov. 9, 2010

(54) IMAGE PROCESSING BASED ON AMBIENT AIR ATTRIBUTES

(75) Inventor: Andrew C. Gallagher, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 12/549,419

(22) Filed: Aug. 28, 2009

(65) Prior Publication Data

US 2010/0045828 A1 Feb. 25, 2010

Related U.S. Application Data

(62) Division of application No. 11/033,072, filed on Jan. 11, 2005, now Pat. No. 7,606,437.

(51) Int. Cl.
*G06K 9/62* (2006.01)
*G06K 9/54* (2006.01)

(52) U.S. Cl. ...................... 382/224; 382/305
(58) Field of Classification Search ......... 382/224–228, 382/100, 103–104, 165, 170, 181, 305; 348/222.1–224.1, 348/370–375; 345/589; 250/330, 338.5; 707/1–7, 104.1
See application file for complete search history.

(56) References Cited

U.S. PATENT DOCUMENTS

| | | | |
|---|---|---|---|
| 5,719,950 A | | 2/1998 | Osten et al. |
| 6,137,893 A | * | 10/2000 | Michael et al. .............. 382/103 |
| 6,573,932 B1 | * | 6/2003 | Adams et al. ............. 348/224.1 |
| 6,804,408 B1 | | 10/2004 | Gallagher et al. |
| 6,807,300 B1 | | 10/2004 | Gindele et al. |
| 7,049,595 B2 | * | 5/2006 | Kansakoski et al. ....... 250/338.5 |
| 7,272,248 B2 | | 9/2007 | Hamid |
| 7,333,669 B2 | | 2/2008 | Gallagher et al. |
| 7,555,165 B2 | * | 6/2009 | Luo et al. ..................... 382/224 |
| 7,664,324 B2 | * | 2/2010 | Khodor et al. .............. 382/181 |
| 7,668,369 B2 | * | 2/2010 | Yen et al. ..................... 382/170 |
| 7,684,599 B2 | * | 3/2010 | Horn et al. ................... 382/128 |
| 2008/0199045 A1 | * | 8/2008 | Ekin ........................... 382/104 |
| 2009/0201309 A1 | * | 8/2009 | Demos ........................ 345/589 |

OTHER PUBLICATIONS web site http://www.dpreview.com/news/00005/00050104ccdtemperature.asp, the effect of temperature on CCD's.
"Temporal Event Clustering for Digital Photo Collections" by Matthew Cooper, et al., MM '03 Nov. 2-8, 2003, Berkeley, CA.
"Digital Image Enhancement and Noise Filtering by Use of Local Statistics" by Jong-Sen Lee, IEEE Transactions on Pattern Analysis and Machine Intelligence, vol. PAM1-2, No. 2 Mar. 1980.

* cited by examiner

*Primary Examiner*—Sherali Ishrat
(74) *Attorney, Agent, or Firm*—Raymond L. Owens

(57) ABSTRACT

A method of processing a digital image captured by a camera includes providing an ambient air measuring device associated with the camera; using the ambient air measuring device to measure air attributes at substantially the time the digital image was captured; determining a transform for modifying the digital image from the measured air attributes; and applying the transform to the digital image to produce an improved digital image.

7 Claims, 7 Drawing Sheets

IMAGE PROCESSING BASED ON AMBIENT AIR ATTRIBUTES

CROSS REFERENCE TO RELATED APPLICATIONS

This application is a divisional of U.S. Ser. No. 11/033,072 (U.S. Patent Application Publication No. 2006/0153469), filed Jan. 11, 2005, (now U.S. Pat. No. 7,606,437) entitled "Image Processing Based on Ambient Air Attributes" by Andrew C. Gallagher. Reference is made to commonly assigned U.S. patent application Ser. No. 10/747,597, filed Dec. 29, 2003, (now U.S. Pat. No. 7,336,819) entitled "Detection of Sky in Digital Color Images" by Gallagher et al and U.S. patent application Ser. No. 10/712,181, filed Nov. 13, 2003 (U.S. Patent Application Publication No. 2005/0105775), entitled "Method of Using Temporal Context for Image Classification" by Luo et al, the disclosures of which are incorporated herein.

FIELD OF INVENTION

The field of the invention relates to digital cameras and image processing based on ambient air attributes.

BACKGROUND OF THE INVENTION

Noise

Noise in digital images is generally undesired. Many noise reduction algorithms exist that are appropriate for reducing the magnitude of noise in a digital image and improving the appearance of the image. An example of a noise reduction algorithm is the Sigma Filter, described by Jong-Sen Lee in the journal article "Digital Image Smoothing and the Sigma Filter", Computer Vision, Graphics, and Image Processing, Vol. 24, 1983, pp. 255-269. Lee discloses a noise reduction filter that uses a non-linear pixel averaging technique sampled from a rectangular window about the center pixel. Pixels in the local neighborhood are either included or excluded from the numerical average on the basis of the difference between the pixel and the center pixel. The Sigma Filter was designed for image processing applications for which the dominant noise source is Gaussian additive noise. Signal dependent noise sources can be incorporated by making noise reduction control parameters a function of the signal strength. However, it can be difficult to determine the noise characteristics of a camera. One reason for this difficulty is the signal dependent noise from an image sensor varies greatly with the temperature of the image sensor.

Snow/Ice Detection

One fundamental task in image processing is to automatically determine the likelihood that regions (a connected group of pixel positions) or pixels of an image represent a specific material. This can be quite difficult, especially because the computer lacks the contextual information about the image. Current techniques use features derived from the image to generate belief maps (e.g. above cited, commonly-assigned U.S. patent application Ser. No. 10/747,597 in the case of sky detection). For example, a white region in an image may or may not represent snow. Such techniques often produce incorrect results because as is it extremely difficult to produce features that can robustly be used for classification.

In a related task, sometimes it is necessary to classify an entire image. For example, in many cases it is useful to classify a digital image as either an outdoor image or an indoor image. Performing this task by using the image data alone is quite difficult and prone to errors.

Event Clustering

Individuals are amassing large collections of digital images. One useful way to organize these images is as a set of events, where each event includes a set of digital images that are related by the event at which they were captured. Manual event clustering can be labor-intensive. Automatic methods of event segmentation focus almost exclusively on using the digital images' timestamps. For example, an event clustering algorithm is described by Cooper et al. in "Temporal Event Clustering for Digital Photo Collections," MM '03, Nov. 2-8, 2003, Berkeley, Calif. This method leaves much room for improvement. It does not take advantage of the fact that generally the environment at an event is relatively stable.

Search

In order to find a specific image from a collection of digital images, it is necessary to search for it. Manual searching is time-consuming and tiring. Automatic searching relies on a combination of matching between a query and features extracted from the image or labels that are associated with the image. For example, U.S. Pat. No. 6,480,840 describes a method for image retrieval based on image content similarity. Such a method can require several iterations and frequently produces incorrect results. No information about ambient air characteristics is used to improve the results.

SUMMARY OF THE INVENTION

It is an object of the present invention to facilitate the processing of digital images captured by a digital camera by using measured ambient air attributes.

This object is achieved by a method of processing a digital image captured by a camera comprising:

(a) providing a ambient air measuring device associated with the camera;

(b) using the ambient air measuring device to measure air attributes at substantially the time the digital image was captured;

(c) determining a transform for modifying the digital image from the measured air attributes; and (d) applying the transform to the digital image to produce an improved digital image.

By measuring air attributes at substantially the time the digital image is captured by the digital camera, these attributes can be used to improve the processing of such captured digital image.

DETAILED DESCRIPTION OF THE INVENTION

Figure 1:
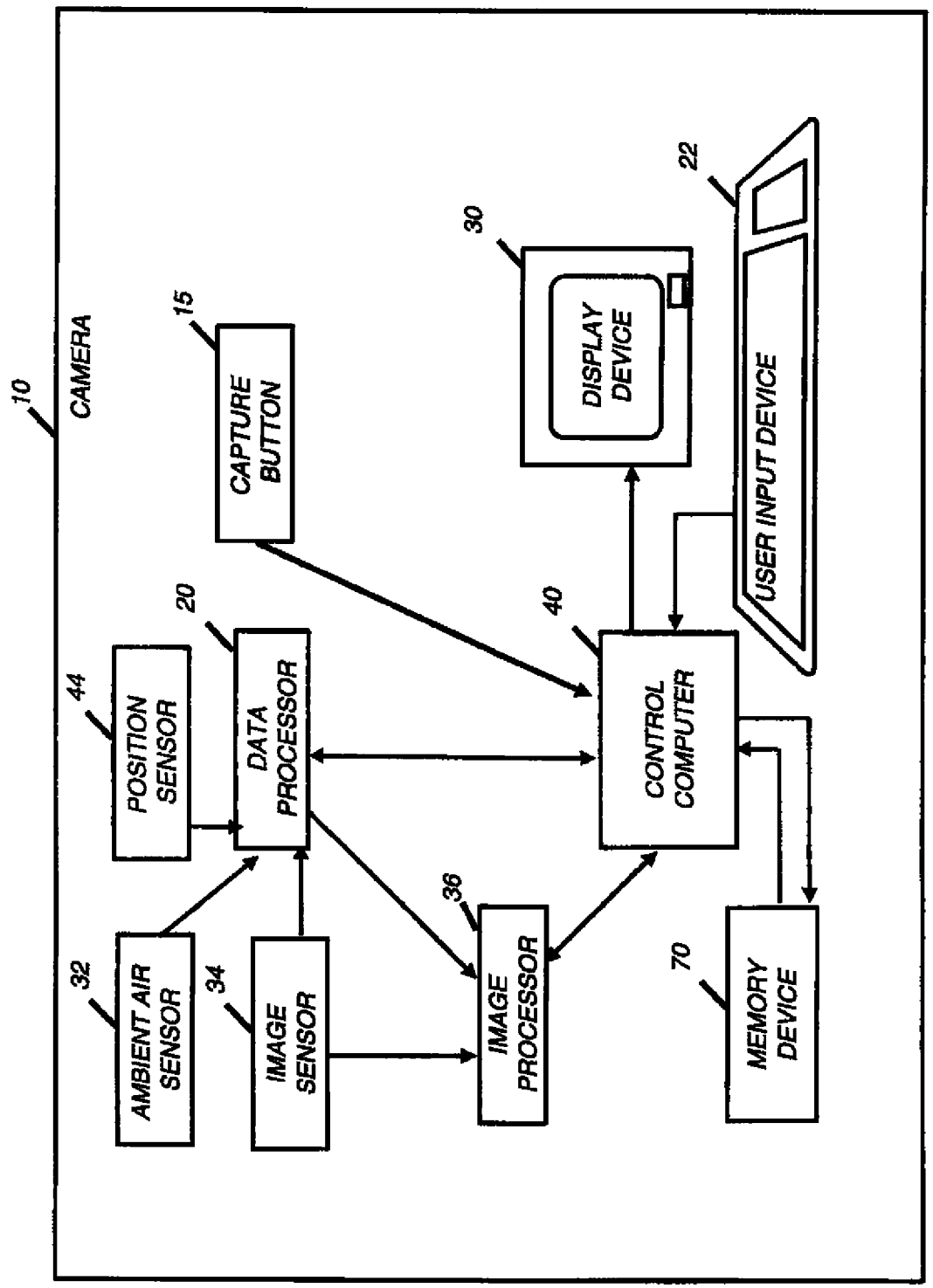
FIG. 1 is a block diagram representing a digital camera that can practice the invention.

FIG. 1 shows the inventive digital camera 10. The camera includes user inputs 22. As shown, the user inputs 22 are buttons, but the user inputs 22 could also be a joystick, touch screen, or the like. The user uses the user inputs 22 to command the operation of the camera 10, for example by selecting a mode of operation of the camera 10. The camera 10 also includes a display 30 upon which the user can preview images captured by the camera 10 when the capture button 15 is depressed. The display 30 is also used with the user inputs 22 so that the user can navigate through menus. The display 30 can be, for example, a liquid crystal display (LCD) or organic light emitting diode (OLED) screen, as are commonly used on digital cameras. The menus allow the user to select the preferences for the camera's operation. The camera can capture either still images or images in rapid succession such as a video stream.

The general control computer 40 shown in FIG. 1 can store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by memory device 70. The control computer 40 is responsible for controlling the transfer of data between components of the camera 10. For example, the control computer 40 determines that the capture button 15 is pressed by the user and initiates the capturing of an image by the image sensor 34.

The image processor 36 can be used to process digital images to make adjustments for overall brightness, tone scale, image structure, etc. of digital images in a manner such that a pleasing looking image is produced by an image display device 30. Those skilled in the art will recognize that the present invention is not limited to just these mentioned image processing functions.

The data processor 20 is used to process image information from the digital image as well as information from the ambient air sensor 32 and position sensor 44 to generate metadata for the image processor 36 or for the control computer 40. The operation of the data processor 20 will be described in greater detail hereinbelow.

It should also be noted that the present invention can be implemented in a combination of software and/or hardware and is not limited to devices that are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Internally, the digital view camera 10 integrally includes an ambient air sensor 32 for measuring attributes or characteristics of the ambient air surrounding the camera 10 at arbitrary times. The measured air characteristics are represented as a vector A. The ambient air sensor 32 is capable of determining the characteristics of the ambient air surrounding the camera without the need for capturing an image. These air characteristics are associated with a digital image, and are used by the present invention to improve image noise characteristics, classify regions of an image according to the materials that these regions represent, classify images as indoor or outdoor, cluster related images into events and searching for specific images.

The ambient air sensor 32 may be any ambient air sensor known in the art, such as a temperature sensor, a humidity sensor, or a barometric pressure sensor. A temperature sensor measures the temperature of the ambient air. For example, a suitable temperature sensor by National Semiconductor of Santa Clara Calif. is part number LM75BIM-3. This sensor measures temperatures of −55 C to 125 C, which is far greater than the typical temperature range in environments where consumer grade digital cameras are typically used. A humidity sensor measures the water content in the ambient air. For example, a suitable humidity sensor by Sensirion AG of Zurich Switzerland is SHT11 which measures relative humidity within 3.5% Relative Humidity. Additionally, the SHT11 also measures ambient air temperature. Finally, a barometric pressure sensor measures the air pressure. For example, the sCAP1 by Kavlico Corp. of Moorpark, Calif. is a suitable barometric pressure sensor. Preferably the ambient air sensor 32 is a temperature sensor because temperature sensors are inexpensive and provide significant improvements to the processing of digital images.

Referring again to FIG. 1 optionally an additional position sensor 44 integral with the camera 10 can be used to determine the position of the camera with respect to the earth. The position sensor 44 is preferably a GPS sensor that relies on the Global Positioning Satellites to determine the relative position of the camera with a set of satellites orbiting the earth, and ultimately the latitude and longitude of the camera.

Figure 2:
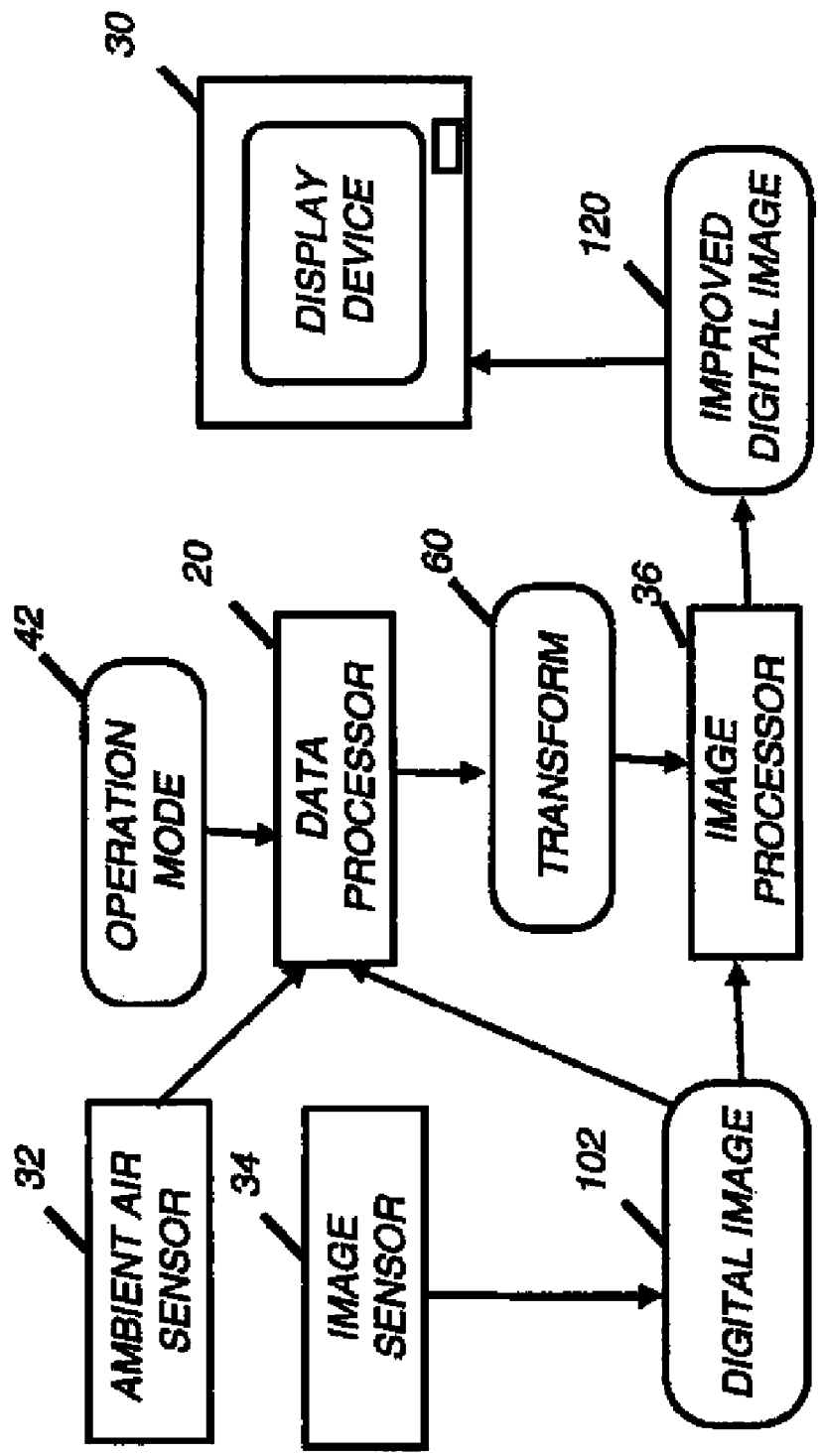
FIG. 2 is a block diagram representing the operation of the digital camera in FIG. 1.

Referring to FIG. 2, the image sensor 34 captures a digital image 102 and produces a raw image that is passed to an image processor 36. The image processor 36 prepares the raw image for viewing by interpolating missing pixel values from the image sensor 34, applying color correction matrices, rendering the image, and the like. Additionally, the data processor 20 analyzes the air characteristics A from the ambient air sensor 32 and possibly the digital image 102 (or a partially corrected version of the digital image from the image processor 36) to produce a transform 60 in accordance with an operating mode 42 of the camera. The image processor 36 applied the transform 60 and outputs an improved image 120.

The measured air characteristic information could be a series of vectors A. For example, the ambient air sensor 32 is queried every 1/120 second as soon as the capture button 15 begins to be depressed, creating a series of ambient air attribute information $A_0$ to $A_{n-1}$. In addition, the ambient air sensor 32 is queried at substantially the time the image is captured to produce air characteristic information $A_n$. Additional air characteristic information $A_{n+1}$ to $A_m$ can also be recorded after the image is captured. When the camera 10 captures a video stream, there may be one air information A for each digital image of the video stream. Or there may be one air information A for several frames of the video stream. There may also be several air information vectors A for each frame of the video stream.

The image 102 has an associated vector A that relates to the measurements of the ambient air at substantially the time the image 102 was captured. Those skilled in the art will recognize that the vector A may relate to characteristics related to the ambient air slightly before or after the digital image 102 (e.g. 1/30 second) is actually captured. Because the characteristics of the ambient air surrounding the camera 10 change slowly, a vector A acquired slightly before or after the time the image 102 is captured is said to be captured at "substantially the time" the digital image 102 was captured.

Metadata is information related to the image not including pixel data. The vector A describing characteristics of the ambient air surrounding the camera 10 is an example of metadata. Several additional metadata items are also input to the data processor 20. The time and date of the capture of the digital image 102 and for instance other data related to the capture of the digital image such as exposure time (in seconds) and focal length $f_l$ (in pixels) at the time of image capture are included. In addition, metadata includes the current camera settings such as the status of menu items or operating modes 42 as selected by the user. The vector A associated with the digital image 102 could be stored as metadata (metadata is information related to the image not including pixel data) associated with the digital image 102.

The data processor 20 then generates a transform 60 based on the ambient air characteristics vector A and possibly other metadata. The data processor 20 outputs a transform 60 for modifying the digital image 102 for producing an improved digital image 120. The improved digital image 120 may be viewed or reviewed on the display 30 so that the user can see the image and decide whether to accept the image, delete the image, modify parameters associated with the data processor 20, or simply keep the original digital image 102 instead of the improved digital image 120. The transform 60 is generated by the data processor by considering the information describing the ambient air information A.

In general, the transform 60 is created by determining undesirable characteristics in an image related to certain ambient air characteristics, and designing a transform 60 to reduce or remove the undesirable effect.

The transform 60 is computed based on a user-selectable operating mode 42. For example, if the camera is in "Reduce Image Noise" mode, then the transform 60 is designed to reduce image noise. It is well known that noise in digital images is related to the temperature of the image sensor 34. For example, the web site http://www.dpreview.com/news/0005/00050104ccdtemperature.asp claims that for some image sensors, noise doubles every 6 to 8 degrees Celsius. Furthermore, many noise removal transforms rely on a priori knowledge of noise magnitude. Therefore, by knowing the temperature of the image sensor (which is closely related to the temperature of the ambient air), a more accurate estimate of the noise is used by a transform 60 used for noise removal.

Preferably, the transform 60 used to reduce image noise is the one described in U.S. Pat. No. 6,807,300. This noise filter requires the knowledge of the relationship between image intensity value and noise level (i.e. standard deviation of noise). This information is typically represented in a noise table representing noise magnitude vs. intensity of the digital image. In the preferred embodiment, the noise table is selected based on temperature.

For example, at the time of manufacturing, the following noise tables can be loaded into camera memory, where each noise table is associated with a given temperature:

| Temp: 0° C. | |
|---|---|
| Intensity | Noise Magnitude (standard deviation) |
| 0 | 2 |
| 64 | 2 |
| 128 | 2 |
| 192 | 1 |
| 255 | 1 |

| Temp: 20° C. | |
|---|---|
| Intensity | Noise Magnitude (standard deviation) |
| 0 | 3 |
| 64 | 4 |
| 128 | 4 |
| 192 | 3 |
| 255 | 2 |

| Temp: 40° C. | |
|---|---|
| Intensity | Noise Magnitude (standard deviation) |
| 0 | 6 |
| 64 | 7 |
| 128 | 6 |
| 192 | 5 |
| 255 | 3 |

This data can be generated by, for example, photographing uniform objects (e.g. gray cards) at varying exposures and temperatures. Note that a separate noise table can be supplied for each color channel.

When the ambient air characteristic A is an air temperature not explicitly associated with a noise table, interpolation is used to generate a noise table. For example, using the above illustrative data, a noise table can be generated for temperature of 30° C. by interpolating between the noise tables associated with 20° C. and 40° C.

Alternatively, a noise temperature model can be used to adjust a noise table to account for the effect of temperature on the noise in the image. For example, a noise table can be specified as:

| Temp: 0° C. | |
|---|---|
| Intensity | Noise Magnitude (standard deviation) |
| 0 | 2 |
| 64 | 2 |

-continued

Temp: 0° C.

| Intensity | Noise Magnitude (standard deviation) |
|---|---|
| 128 | 2 |
| 192 | 1 |
| 255 | 1 | and the noise temperature model is that noise doubles every 8° C. Therefore, when the temperature is 16° C., the specified noise table is adjusted according to the noise temperature model to yield the following noise table:

| Intensity | Noise Magnitude (standard deviation) |
|---|---|
| 0 | 8 |
| 64 | 8 |
| 128 | 8 |
| 192 | 4 |
| 255 | 4 |

If the camera is in "Sharpen Image" mode, similar steps are followed. Many sharpening algorithms rely on information related to the magnitude of noise in the image to prevent noise amplification. For example the sharpening algorithm described in U.S. Pat. No. 6,804,408 uses a noise table representing noise magnitude vs. intensity of the digital image. In the preferred embodiment, a noise table is selected or generated based on the ambient air temperature contained in vector A.

To achieve an adjusted digital image 120 midway in appearance between the original image 102, the improved digital image 120 can be linearly mixed with the digital image 102.

$$Iadj=aIo+(1-a)I$$

Where:
a is a user input preferably ranging between 0 and 1.
I is the digital image 102.
Io is the digital image 120.
Iadj is an output image midway in appearance between the original image 102 and the improved digital image 120.
Note that when a=0, the adjusted image is a copy of the digital image 102. When a=1, the adjusted image is identical to the improved digital image 120.

The improved digital image 120 may have associated metadata indicating that a transform 60 was applied. The metadata may contain the ambient air characteristics A and the transform 60.

The image processor 36 applies the transform 60 to the digital image 102 i(x,y) with X rows and Y columns of pixels to produce an improved digital image 120.

Figure 3:
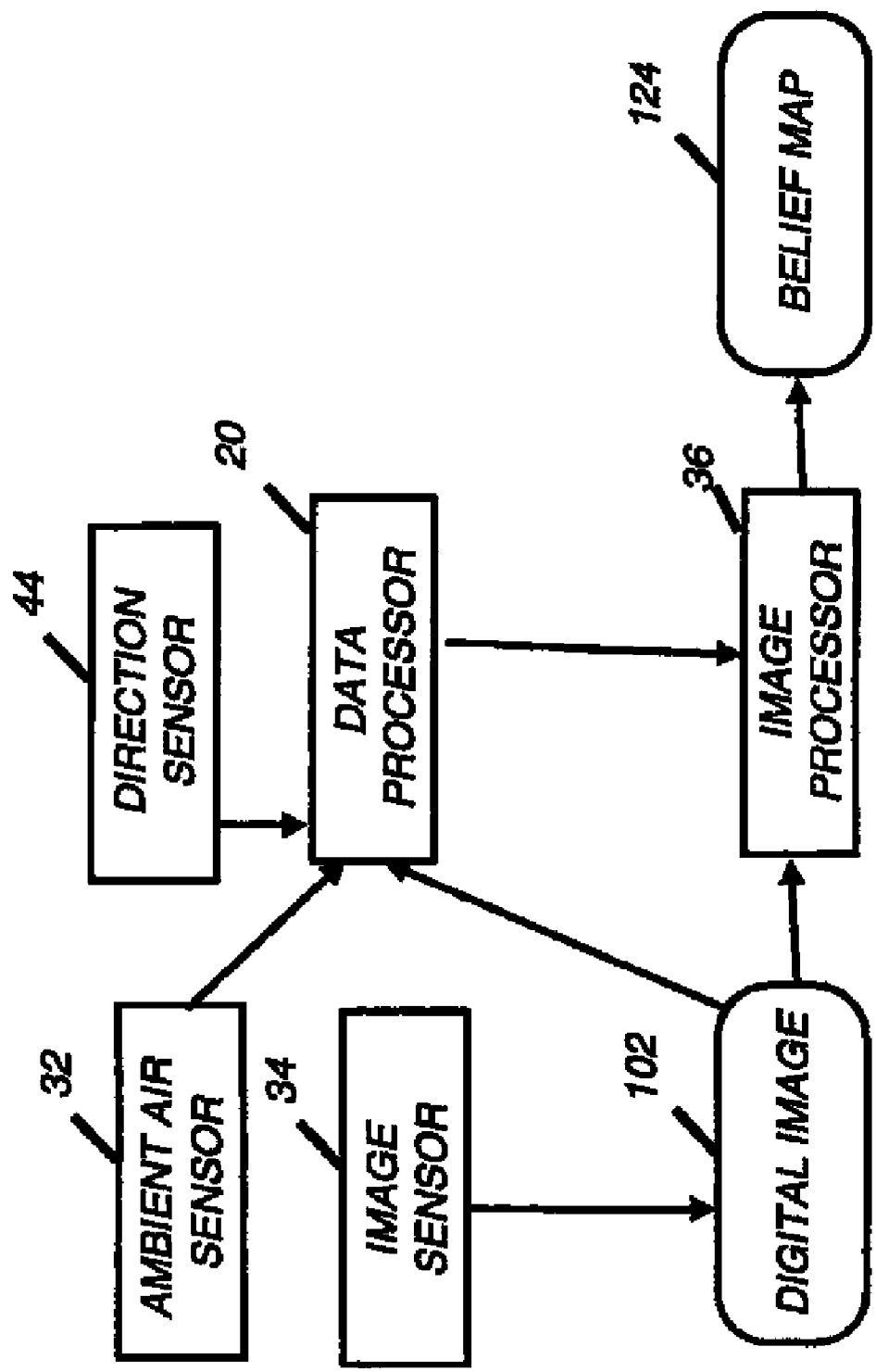
FIG. 3 is a block diagram representing the operation of the digital camera of FIG. 2 for producing a belief map.

FIG. 3 shows an alternative embodiment of the present invention where ambient air characteristics A are used as features to improve the accuracy of pattern classification algorithms.

The image processor 36 computes a belief map 124 from the digital image 102 and the ambient air attributes A. A belief map 124 is a map indicating the likelihood, probability, or belief that a particular pixel or region (i.e. group of pixels) of the image 102 represents a specific material (such as sky, grass, water, human flesh, pavement or road surface, snow, etc.) in the scene. The image processor 36 assigns probabilities based on features computed for a region or pixel of the image 102 such as color, texture, shape, or location within the image and outputs the results in the form of the aforementioned belief map 124. Unfortunately, using only image features can result in ambiguous results. For example, suppose a region is light in intensity, very low in saturation in saturation and low in texture. The probability of that the region represents snow is P(region=snow|features), where the features are for example the region's average intensity, saturation, and texture magnitude. The value of P(region=snow|features) is generally determined using a classifier, such as the well known neural network, Gaussian Maximum Likelihood (GML), Bayesian Network, KNN classifier, Support Vector Machine (SVM) or the like. However, even the most sophisticated classification system cannot accurately distinguish between classes when their distributions (e.g. P(features|region=snow) and P(features|region=white carpet)) overlap. Therefore, the performance of the classifier is greatly improved by introducing as a new feature the ambient air characteristics A. Alternatively; the classification system can be separated into multiple classification systems depending on the values of the ambient air characteristics A. For example, when the air temperature is >10° C., there is almost no chance that snow will appear in the digital image simply because of the fact that snow and ice begin to melt at 0° C. In this embodiment, one classifier is used when the ambient air temperature is >10° C., and a second classifier is used otherwise. In summary, a pixel or region of an image has very low probability that it represents snow or ice if the ambient air temperature is high, even though it might have the color and/or texture features of snow or ice. Likewise, when a pixel or region has the color and/or texture features of snow or ice and the ambient air temperature is lower than the freezing point, then the probability that the pixel or region represents snow or ice increases.

Figure 4:
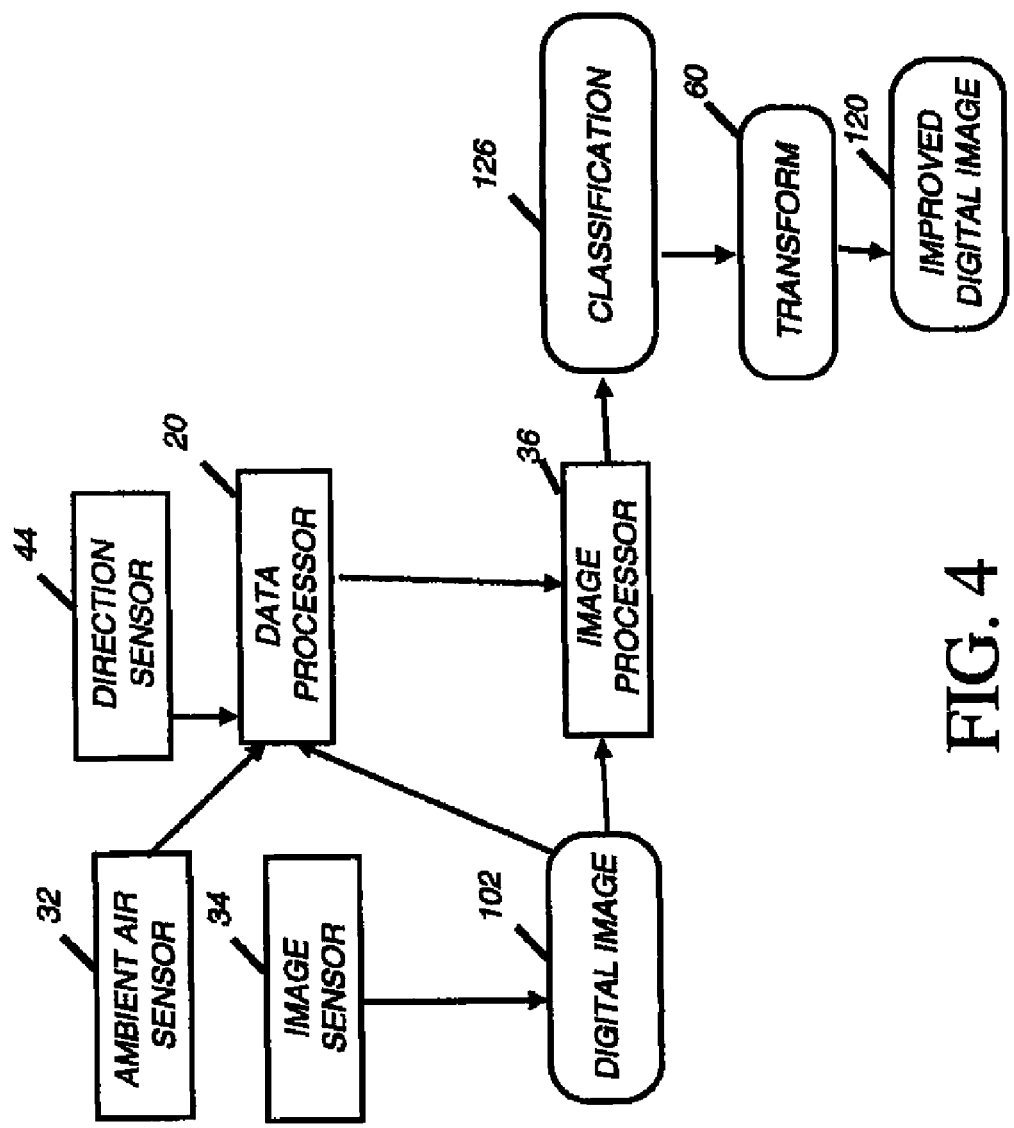
FIG. 4 is a block diagram representing the operation of the digital camera of FIG. 2 for producing a classification.

In a similar manner, the image processor 36 can be used to classify an image as an "indoor" scene or as an "outdoor" scene based on the ambient air characteristic data A from the ambient air sensor 32, as shown in FIG. 4. The image processor 36 computes features from the digital image 102 and uses air characteristic data A as features, and then uses a classifier to classify the image 102 as an indoor image or an outdoor image. For example, when the only feature is ambient air temperature, then image processor 36 returns as the classification 126 for the value of P(image=indoor|features). The classification 126 indicates a likelihood that the digital image 102 is a indoor image.

| Feature: P(image = indoor | features) | |
|---|---|
| Ambient air temperature | |
| −10° C. | 0.2% |
| 0° C. | 2% |
| 10° C. | 5% |
| 15° C. | 52% |
| 20° C. | 83% |
| 25° C. | 66% |
| 30° C. | 19% | and P(image=outdoor|features)=1−P(image=indoor|features) when the reasonable assumption is made that an image must be either an indoor or an outdoor image. In addition to using the ambient air temperature, the relative humidity is also an important feature that can be used to aid the classifier. Generally, the ambient air conditions of indoor locations are controlled to maintain a temperature around 20° C. with low humidity. Certainly the ambient air conditions outdoors can be 20° C. with low humidity, but because of the huge variability in weather conditions, it is quite likely that the ambient air conditions will be quite different.

Those skilled in the art of pattern recognition will recognize that the ambient air features for determining whether an image is an indoor or an outdoor image can be added to a system using other features, such as features derived from the image data itself, as well as the time the image was captured. For example, the ambient air features can be combined with the system described in above cited commonly assigned U.S. patent application Ser. No. 10/712,181. In this system, a Markov model is used take advantage of the fact that two images captured with a only a small amount of intervening time, are likely either both indoor images or both outdoor images.

Alternatively, the image processor 36 may also use position data P from the position sensor 44 as a feature. In the preferred embodiment, the position sensor 44 is a GPS sensor, describing the position of the camera on the earth's surface when the image was captured. For classifying the image as an indoor image or an outdoor image, the image processor 36 looks up the ambient air conditions for the position indicated by the positions data P at the time the image was captured. Then the classifier determines the probability that the image was an indoor image P(image=in|f) by comparing the recorded ambient air conditions A with the looked up ambient air conditions at position P and at the time the image was captured P(f|image=out), along with an assumed distribution for the ambient air conditions of an indoor environment P(f|image=in) and the prior probability P(image=in) of being indoors. For example, using Bayes theorem:

$$P(\text{image} = \text{in} \mid f) = \frac{P(f \mid \text{image} = \text{in})P(\text{image} = \text{in})}{P(f \mid \text{image} = \text{in})P(\text{image} = \text{in}) + P(f \mid \text{image} = \text{out})P(\text{image} = \text{out})}$$

where f is the set of features (e.g. the measured ambient air characteristics A), This method yields very good results, but it can be difficult to implement as it requires an up to date database for determining the P(f|image=out) term.

A transform 60 for improving the digital image 102 can be generated, based on whether the classification 126 indicates that the digital image 102 is an indoor image or an outdoor image. The transform 60 outputs an improved digital image 120. For example, the transform 60 may perform a color balance. Color balance is an important transform for correcting a displeasing color cast that results when a scene is illuminated with non-white light. For example, a digital image of a captured scene illuminated with standard tungsten light bulbs appears quite yellow. Often, a much-improved digital image can be generated by removing the displeasing color cast. One well-known problem with color balance transforms is subject failure that occurs when a color balance transform removes color that is associated with an object in the scene (e.g. a yellow towel) instead of the color of the illuminant. Because tungsten illumination predominantly occurs only in indoor settings, the performance of the color balance transform is improved with the classification 126 information. When the classification 126 indicates that the digital image 102 relates to an outdoor scene, then the color balance is prevented from making corrections that remove yellow from the digital image. Likewise, when the classification 126 indicates that the digital image 102 relates to an indoor scene, then the color balance is prevented from making corrections that remove blue from the digital image. Thus, the transform 60 uses the classification 126 and reduces the occurrence of subject failure.

The data processor 20 may make adjustments to the ambient air characteristics A from the ambient air sensor 32, outputting adjusted ambient air characteristics. For example the data processor 20 may perform calibration.

When moving the camera from a warm environment to a cool environment, it is well known that it takes some time for the camera's temperature to converge with the ambient air temperature. Newton's Law of Cooling states that the rate of temperature change in a body is proportional to the difference in temperature between the body and the surround. Therefore, the ambient air temperature can be estimated even before the camera's temperature has converged with that of the surrounding ambient air, according to the following equation:

$$s = \frac{\theta(t_1) - \theta(t_0)e^{-k(t_1-t_0)}}{1 - e^{-k(t_1-t_0)}}$$

where s is the temperature of the surround (i.e. the ambient air temperature), $\theta(t_0)$ is the temperature at time $t_0$, $\theta(t_1)$ is the temperature at time $t_1$, k is a proportionality constant that can be measured at manufacturing time, and e is the well-known constant 2.71. Thus, the data processor 20 is used to take multiple ambient air temperature readings and estimate the true ambient air temperature that is then associated with the digital image 102.

Figure 5:
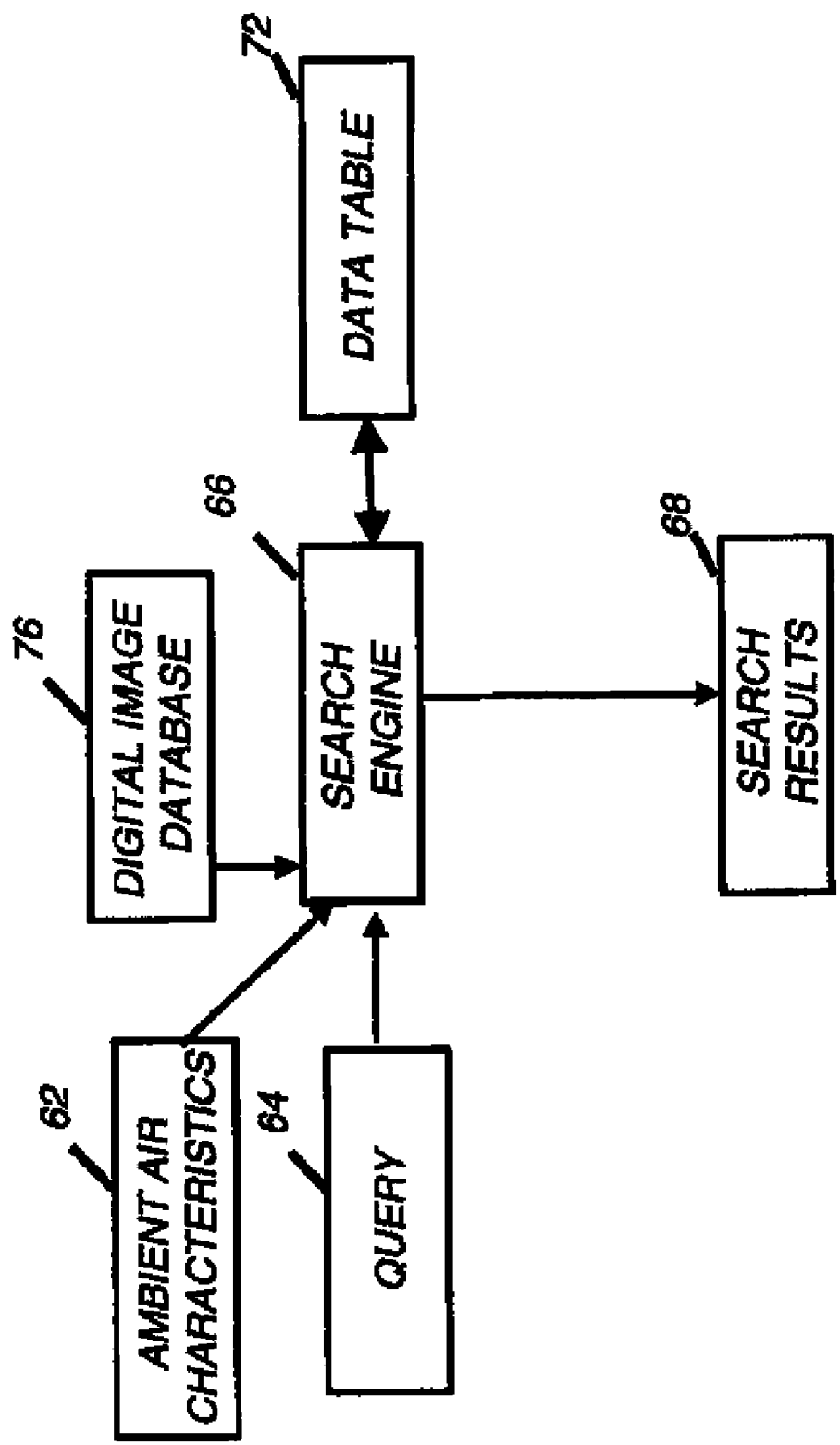
FIG. 5 is a block diagram illustrating the operation of a search engine for retrieving stored digital images based on stored ambient air attributes associated with the stored digital images.

FIG. 5 shows an overview of an image management system that uses ambient air characteristic data A. A user submits a query 64 and a search engine 66 uses ambient air characteristic data A 62 that are associated with images in a digital image database 76 to determine the search results 68, a set of images from the digital image database 76 that best satisfy the query 64. For example, the user can specify the query 64 as "Images at temperatures <=0° C." when attempting to find an image of a ski trip. Or the user can specify the query 64 as "Images at temperatures >40° C." when searching for images of a trip to Death Valley, Calif. The search engine 66 simply compares the ambient air characteristics 62 with the query conditions 64 and determines the set of images that best satisfy the query 64. Note that the features related to ambient air characteristics may be just some of several or many features used in the query by the user to search for images. For example, the used may also specify specific colors or materials (i.e. snow, people, grass, etc.) that must appear in the search result images found by the search engine 66.

Alternatively, rather than using temperatures on an absolute scale, relative semantic terms can be used. For example, a query 64 for "cold" images may result in the search results 68 including all images from the digital image database 76 having an associated ambient air temperature <0° C. The translation of the relative temperature terms such as "hot", "cold", "cool", "warm", to the corresponding absolute temperature equivalents may need to vary geographically as for example a temperature of 12° C. may be considered "cold" in the Florida Keys but might be considered to be "warm" in Nome, Ak. Such varying of the definitions of the relative temperature terms is accomplished at product registration time using the zip code of the user to indicate the geographic region. Alternatively, the query 64 may itself be a digital image along with an associated command. The user submits a query image to the search engine 66 along with an instruction such as:

"Find more images like this one"
"Find images colder than this one"

Then, the search engine uses the ambient air characteristic data A 62 from the query image and uses this to find search result images 68 from the digital image database 70 that satisfy the query command.

The search engine 66 may perform the search at the time the query is submitted. Alternatively, the search engine 66 may perform an indexing to reduce the search times. For example, the search engine 66 builds a data table 72. For example, when the ambient air characteristic is ambient air temperature, the data table 72 contains a list, for each possible ambient air temperature, of the digital images in the digital image database 70 with that ambient air temperature. When a query 64 is submitted to the search engine 66, the data table 72 is analyzed and the search results 68 are quickly determined.

Search results 68 can be shown to the user in any number of ways. Preferably, the search results 68 are sorted so that the images that best meet the requirements of the query 64 are first, then thumbnail views of the digital images in the search results are shown to the user on a display device.

When a series of images are captured, it is often convenient to cluster the images into "events" or sets of digital images that are related by the event at which they are recording. An event can span several minutes such as "images of Timmy's birthday party" or several days "trip to the Bahamas". Images from a digital camera are captured in serial order and the often the problem of determined digital images from a collection associated with an event reduces to identifying the first and the last image of a temporal sequence of images associated with a given event.

Figure 6:
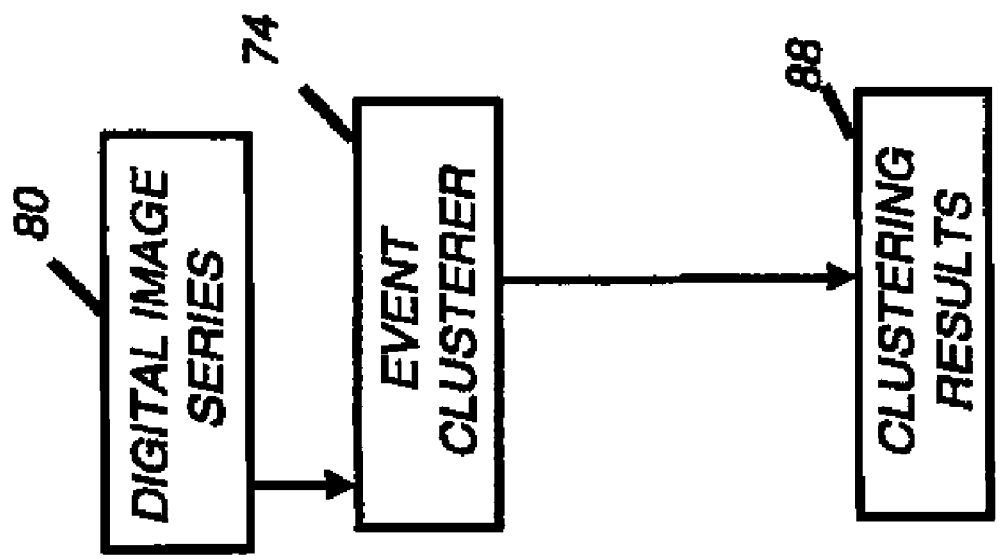
FIG. 6 is a block diagram illustrating the operation of an event clusterer using the stored ambient air attributes associated with the stored digital images.

As seen in FIG. 6, a series of digital images 80 is input to an event clusterer 74 for clustering related images into events. The time an image (either relative or absolute) is captured (also called the "timestamp" or "capture time") is an important feature for determining which images belong to an event. The timestamp is typically stored in the header information of an image file. If the timestamp information is not known or is unavailable, then the time associated with the image file may be substituted for the timestamp. Associated with each digital image of the sequence is the ambient air attribute data A and the timestamp. The image processor analyzes the ambient air attribute data A and other features such as the time each image was captured and possibly the image data itself and determines clustering results 88, where each event of the clustering results 88 contains a set of related images. A clustering algorithm such as the well known K-means or isodata algorithm is used to cluster the digital images into events The clustering results 88 is preferably a set of lists, where each list contains the names of images related to a single event, as determined by the event clusterer 74.

Figure 7:
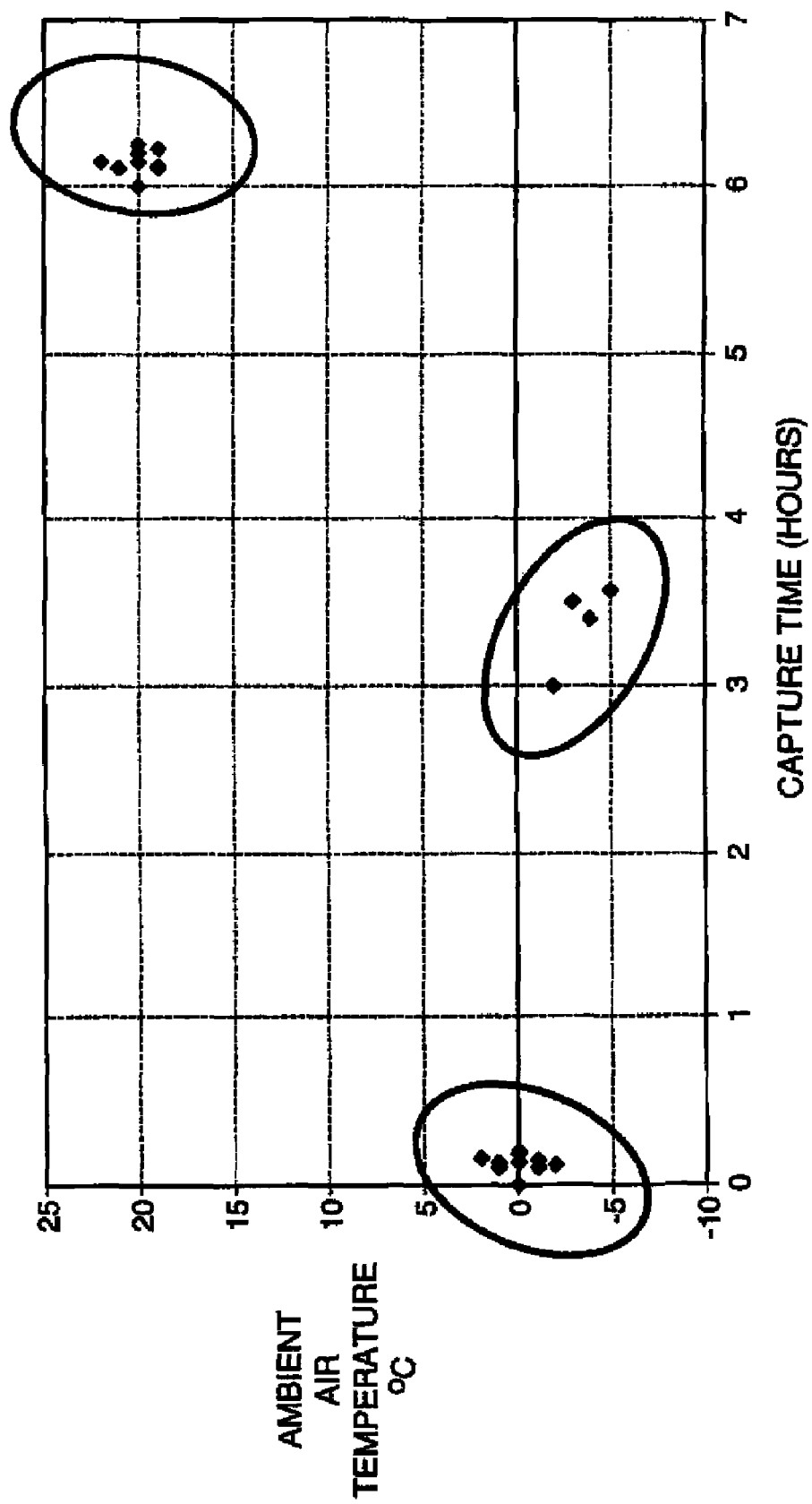
FIG. 7 is a plot of the capture time versus ambient air temperature for a series of digital images and a representation of the resulting clustered events.

For example, FIG. 7 shows a plot where a dot represents a digital image for ambient air attribute data (specifically, ambient air temperature) and relative timestamp. A representation of the results of a clustering algorithm is shown, with ellipses surrounding the dots associated with digital images belonging to a common event. Therefore, the ambient air attribute data A is used to determine related digital images from a set of digital images and associate related digital images to each other.

The invention has been described in detail with particular reference to certain preferred embodiments thereof, but it will be understood that variations and modifications can be effected within the spirit and scope of the invention.

Parts List 10 camera
15 capture button
20 data processor
22 user input device
30 display device
32 ambient air sensor
34 image sensor
36 image processor
40 control computer
42 operation mode
44 position sensor
60 transform
62 ambient air characteristics
64 ambient air characteristics
66 search engine
68 search results
70 memory device
72 data table
74 event clusterer
76 digital image database
80 digital image series
88 clustering results
102 digital image
120 improved digital image
124 belief map
126 classification

The invention claimed is:

1. A method of processing a digital image of a scene captured by a camera comprising:
   (a) providing an ambient air measuring device associated with the camera;
   (b) using the ambient air measuring device to measure air attributes at substantially the time the digital image was captured; and
   (c) classifying regions of the digital image according to the type of material in the scene based on the measured air attributes.

2. The method of claim 1, wherein the material type includes inanimate and animate objects.

3. The method of claim 2, wherein the inanimate objects include sky, grass, water, clouds, pavement, road surface, snow, automobiles, or walls.

4. The method of claim 2, wherein the animate objects include humans or animals.

5. The method of claim 2, wherein the regions are classified by learning the probabilities that a given material appears in an digital image captured with a variety of measured air attributes.

6. The method claimed in claim 1, wherein the measured air attribute is ambient air temperature.

7. The method of claim 1, a stored air attribute for each digital image also includes the time each such digital image was captured and step d) includes using the time of the captured digital images.

* * * * *